United States Patent [19]

Remmel et al.

[11] Patent Number: 4,679,776
[45] Date of Patent: Jul. 14, 1987

[54] ELASTIC RUBBER BEARING WITH HYDRAULIC DAMPING

[75] Inventors: Jochen Remmel; Robert Büchinger, both of Remscheid, Fed. Rep. of Germany

[73] Assignee: Diehl GmbH & Co., Nuremberg, Fed. Rep. of Germany

[21] Appl. No.: 732,452

[22] Filed: May 9, 1985

[30] Foreign Application Priority Data

May 16, 1984 [DE] Fed. Rep. of Germany ....... 3418123

[51] Int. Cl.$^4$ ...................... F16F 15/04; F16M 13/00; B60G 15/04
[52] U.S. Cl. .................. 267/140.1; 248/636; 267/8 R
[58] Field of Search ............... 267/8 R, 35, 63 R, 113, 267/140.1, 140.4; 248/562, 634, 636; 188/266, 268, 298; 180/300; 280/710

[56] References Cited

U.S. PATENT DOCUMENTS 3,554,527  1/1971  Hall ..................................... 267/116
4,407,491 10/1983  Kunihiro et al. ................ 267/140.1

FOREIGN PATENT DOCUMENTS 0098331  1/1984  European Pat. Off. ......... 267/140.1
1243464  6/1967  Fed. Rep. of Germany ...... 267/153
3225700  7/1982  Fed. Rep. of Germany .
0149436 11/1980  Japan ............................. 267/140.1
0823701  4/1981  U.S.S.R. ........................... 188/298

Primary Examiner—Andres Kashnikow
Assistant Examiner—Robert J. Oberleitner
Attorney, Agent, or Firm—Scully, Scott, Murphy & Presser

[57] ABSTRACT

An elastic rubber bearing with integrated hydraulic damping or cushioning, in which a bearing core, a ring-shaped spring element, and a bottom plate enclose a work chamber which is filled with a hydraulic fluid. the work chamber communicates through a restrictive or throttled opening with a liquid-filled expansion chamber which is changeable in volume, and wherein intermediate the two chambers there is positioned a separating wall constituted of an elastic material and a rigid separating wall having perforations therein.

6 Claims, 5 Drawing Figures

ELASTIC RUBBER BEARING WITH HYDRAULIC DAMPING

BACKGROUND OF THE INVENTION

1. Field of the Invention

The present invention relates to an elastic rubber bearing with integrated hydraulic damping or cushioning, in which a bearing core, a ring-shaped spring element, and a bottom plate enclose a work chamber which is filled with a hydraulic fluid. The work chamber communicates through a restrictive or throttled opening with a liquid-filled expansion chamber which is changeable in volume, and wherein intermediate the two chambers there is positioned a separating wall constituted of an elastic material and a rigid separating wall having perforations therein.

2. Discussion of the Prior Art

From the disclosure of German Pat. No. 32 25 700 there has become known an elastic rubber bearing, or socalled silent block bearing, in which a bearing core, a ring-shaped or annular spring element, and a bottom plate enclose a work chamber which is filled with a hydraulic fluid or liquid. The work chamber is separated from a liquid-filled volumetrically-variable expansion chamber through the interposition of a separating wall of an elastic material which is provided with slits, and with rigid separated walls being arranged on both sides of the latter which possess perforations. An annular passageway is provided in the separating walls. During the initiation of vibrations, the pressure which acts on the separating walls will fluctuate. An opposition to an increase in pressure is caused by the increasing passage of fluid through the restricted opening, which attains its optimum upon reaching of the limiting pressure. At the occurrence of a pressure drop-off, this is compensated for by a cut which then opens into a slit. The throttling or restrictive cross-section is thus imparted a constant expansion in dependence upon the pressure differential which is available between the working chamber and the expansion chamber, such that, especially at vibrations having a high amplitude and low frequency, there is added a hydraulic damping to the damping of the material.

Herein, it is disadvantageous that within the supercritical range, vibrations possessing a high frequency and low amplitudes are only sufficiently acoustically isolated, inasmuch as the heretofore known bearings will dynamically stiffen themselves extensively at an increase in the frequency.

SUMMARY OF THE INVENTION

Accordingly, it is an object of the present invention to provide an elastic rubber bearing with integrated hydraulic damping, which will possess in the subcritical range ("motor chattering" at 6–20 Hz) the desired high degree of damping, but which will not dynamically stiffen within the supercritical range, and thereby possesses a good sound insulation through solid bodies.

Of importance to the invention is the new kind of arrangement of the work chamber and the expansion chamber, through which there afforded an assured uncoupling of the expansion chamber, inclusive of the integrated throttling system, at higher frequencies. At low amplitudes and high frequencies, the expansion chamber as well as the throttling system will conduct the same vibrations through the liquid column which the frame or bearing spring has forced thereon through the vibration system of the motor frame or chassis, without the formation or generation of any hydraulic damping. At lower frequencies and higher amplitudes, the hemi-spherical flow surface, which is basically constructively only possible through the already hereinabove addressed special arrangement of the expansion chamber relative to the work chamber, ensures a maximum of a viscous damping within the subcritical range.

As a consequence, there is solved the conflict in the targeted object which is desired upon the design of an elastic motor mount; in effect, within the range of lower frequencies and higher amplitudes there is reduced the "motor chattering" inasmuch as the bearing will behave in a manner as to be relatively hard because of the high degree of damping, whereas within the range of higher frequencies and lower amplitudes; however, there can be achieved a good sound insulation through solid bodies, since due to the uncoupling system there is obtained a comparatively soft bearing support.

In accordance with further advantageous features of the invention, the rubber bearing is constructed so as to be small in volume. The uncoupling characteristic is to be determined in such a manner through the construction and/or the material selection of the elastic bearing, that there is provided the presence of a relatively smooth or soft application of the hydraulic damping. Prevented is any development of noise, such as the chattering of the rubber bearing under sudden load changes.

Pursuant to another feature of the invention, the membrane is additionally further uncoupled.

For this purpose, pursuant to the invention, this membrane can be arranged intermediate two screen-like, hemispherical support members, or alternatively, can be seated below the hemispherical support member and elastically coupled thereto with a limited extent of movement.

Further features of the invention relate to provisions for a reduction in operating noises. The hemispherical membrane leads to a large-surfaced overflow area of maximum size. Through suitable profiling of the flow surface there are provided interdigitating passageways or channels which dampen the operating noises.

Pursuant to another feature there is achieved that, at a large pressure difference, the membrane will provide flow passageways of larger cross-section, such that the membrane is partly raised away from the rigid support member. The structured surface of the elastic membrane dampens the operating noises. An important addition which aids in the reduction of operating noises is achieved through the utilization of the elastic material for the membrane.

BRIEF DESCRIPTION OF THE DRAWINGS

Reference may now be had to the following detailed description of exemplary embodiments of the invention, taken in conjunction with the accompanying drawings; in which.

DETAILED DESCRIPTION

Figure 1:
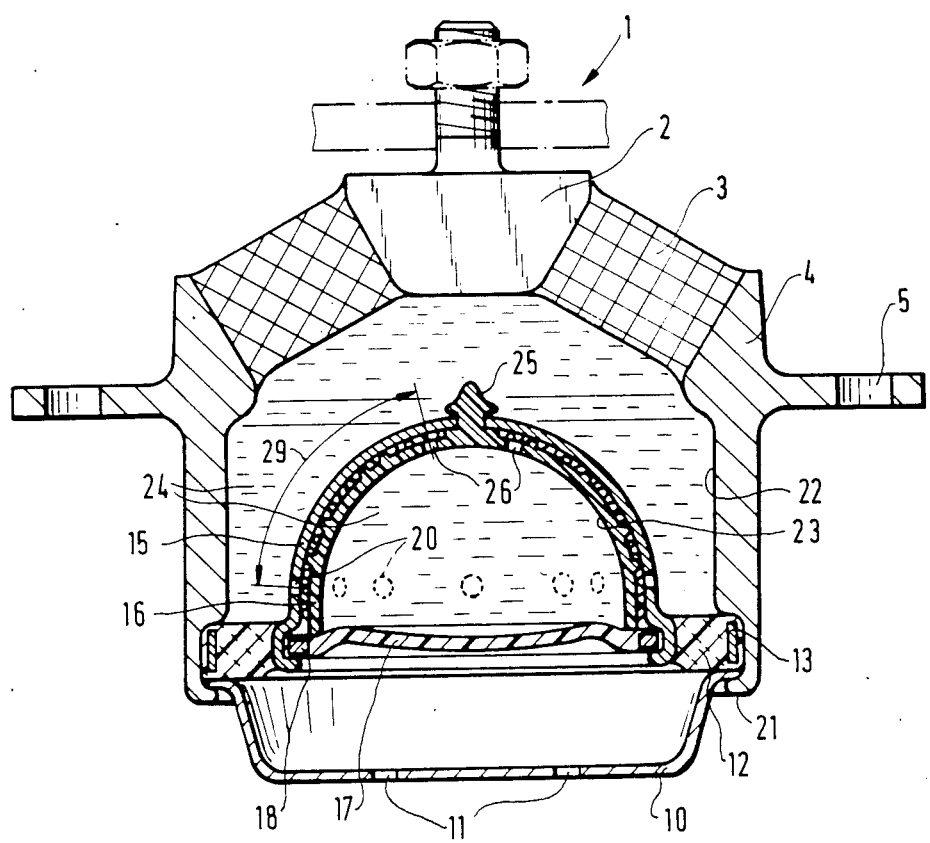
FIG. 1 illustrates a sectional view through an elastic rubber bearing constructed pursuant to the present invention.

In accordance with FIG. 1, an elastic bearing 1 consists of a motor mount 2, a ring-shaped spring element 3, a housing 4 with thrust bearings 5, a bottom tray cap 10 with vent openings 11, and elastic ring 12 with reinforcement 13, a support member 15 which is vulcanized to the elastic ring, and elastic membrane 16, and an elastic wall of an expansion chamber 17 with a stiffener ring 18.

The motor mount 2 and the housing 4 are interconnected through the intermediary of vulcanizing with the spring element 3.

The support member 15 includes annularly-spaced openings 20 along its base portion.

The support member 15 which is vulcanized to the ring 12, together with the bottom tray cap 10, is flanged at 21 into the housing 4. In the same manner is the elastic wall of the expansion chamber 20 flanged into the support member 15.

A work chamber 22 and an expansion chamber 23 are filled with damping fluid or liquid 24.

Figure 2:
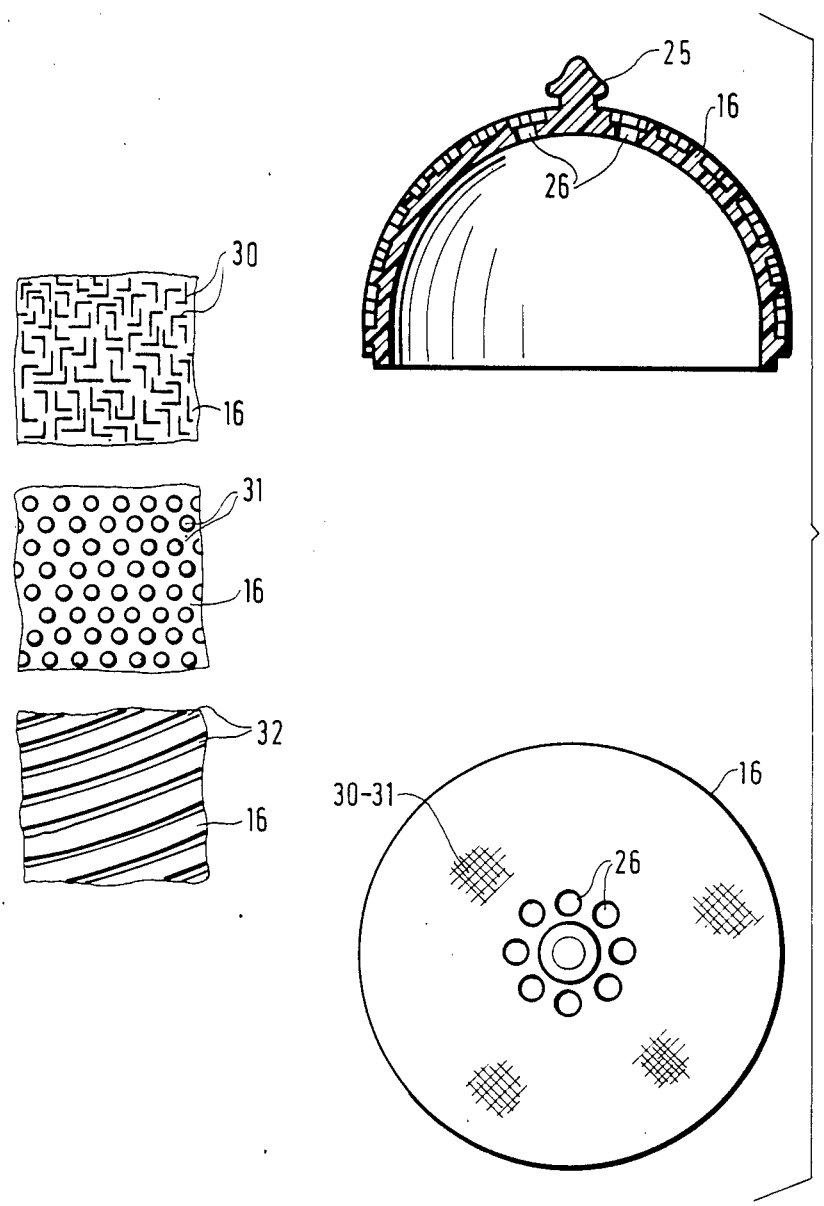
FIG. 2 illustrates a sectional and a plan view of the elastic membrane of the bearing of FIG. 1 with different surface structures.

In accordance with FIG. 2, the membrane 16 includes a fastening projection 25 and openings 26 located in proximity therewith. The surface of the membrane 16 is structured through the intermediary of labyrinthlike arranged, angled lands 30, knubs 31, or helically arranged ring lands 32. However, the membrane 16 can also possess a composite structure of the above-mentioned or other types of elements or profiled surfaces.

In the subcritical range, in effect, at vibrations of high amplitude and low frequencies, liquid 24 is pumped from the work chamber 22 into the expansion chamber 23. The high degree of damping is achieved due to the hemispherical flow surface between the support member 15 and the membrane 16, wherein the liquid traverses a path necessitated by the structured surface of the membrane 16, which corresponds to a multiple of the arcuate section 29 between the openings 20 and 26.

In the motor stuttering or chattering range at 9–12 Hz, there is no excessive increase in resonance.

In the supercritical range, at vibrations having low amplitudes and high frequencies, the damping is minimal due to the open flow path provided by the membrane; in effect, the liquid is not pumped over between the work chamber and the expansion chamber. The open flow path is achieved through the capability in the change in shape of the elastic suspension of the expansion chamber 12 and of the membrane 16 in the region of the bores 20 in the support member 15. Consequently, there is no undesirable power transmission with attendant noise development.

Figure 3:
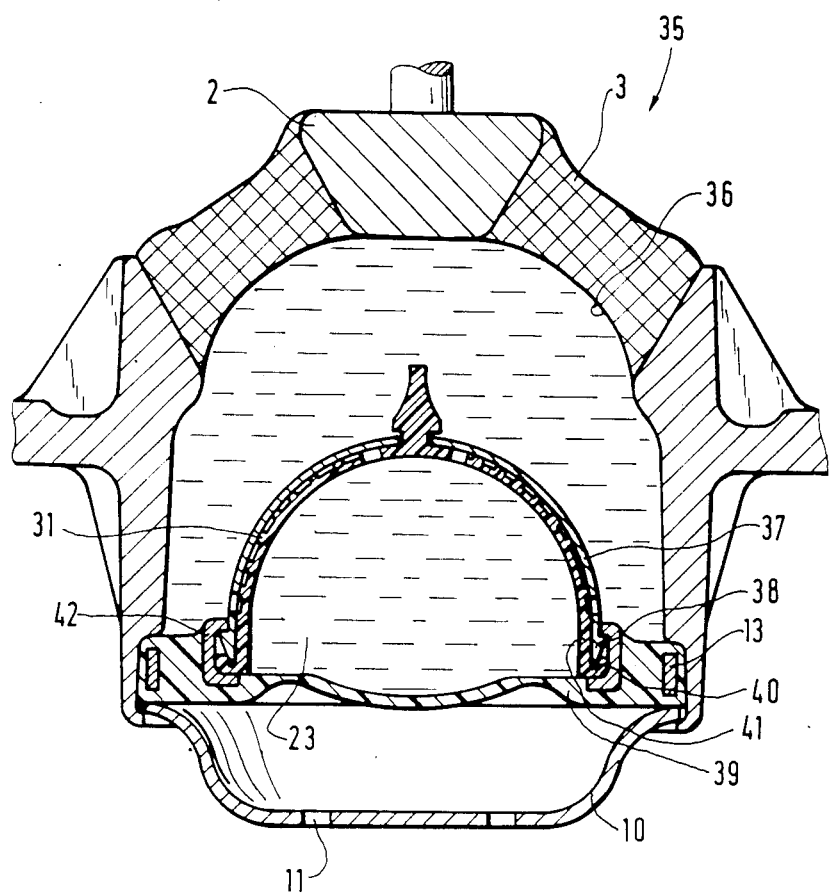
FIG. 3 illustrates a modified configuration of the separating wall and its support in the bearing with respect to that of FIG. 1.

According to FIG. 3, there is provided an elastic bearing with integrated hydraulic damping 35 in a simple structural construction. For this purpose in comparison with the bearing 1 of FIG. 1, it provides for a work chamber 36 with a unitary elastic wall 39 of the expansion chamber which is flanged into the bottom tray cap 10.

A support member 37, preferably constituted of plastic material, is latched in a liquid-tight manner in the clamping ring 42 through simple pressing by means of a projection 38 and under the cooperative effect of a membrane 41, which is equipped with a sealing ring 40.

In that manner, there is eliminated any additional flanging, as in the bearing 1 shown in FIG. 1. The membrane 41 incorporates the knubs 31 according to FIG. 2. The clamping or retaining ring 42 is connected by means of vulcanizing with the elastic wall 39 of the expansion chamber. The resiliently-elastic wall 39 and the bottom tray cap 10 are flanged into a housing 42. The function of the bearing corresponds to that of the bearing illustrated in FIG. 1 of the drawings.

Figure 4:
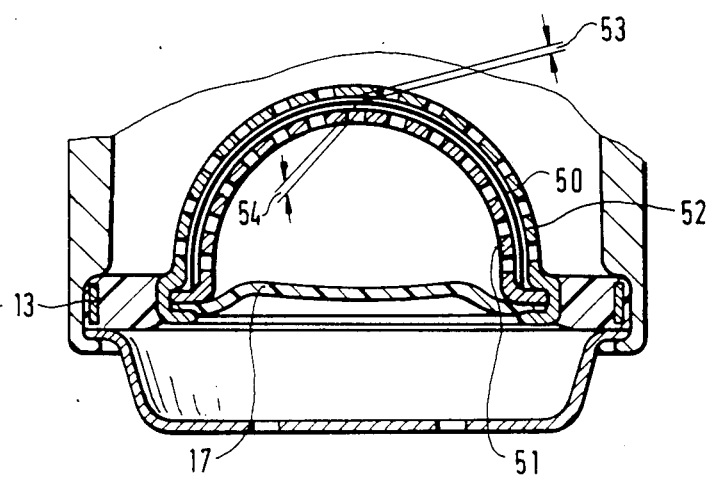
FIG. 4 illustrates a construction of a modified separating wall relative to that shown in FIG. 4.
Figure 5:
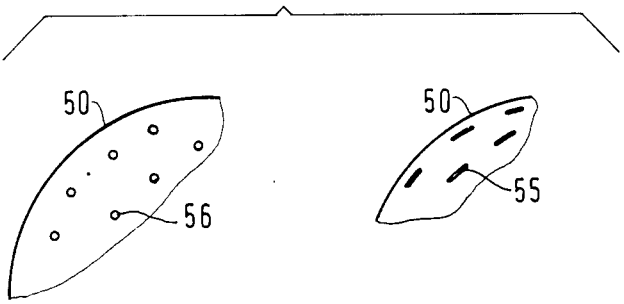
FIG. 5 illustrates two embodiments of apertures which are formed in the elastic membrane.

In accordance with FIG. 4, a membrane 50 is loosely inserted between two hemispherical support members 51, 52. The support members 51, 52 are constructed in a screen-like means by the provision of openings 20; whereas pursuant to the construction of FIG. 5, the membrane 50 possess as either small cuts 55 or slits, or small holes 56.

In the unloaded condition of the membrane 50, the latter evidences spaces 53, 54 with respect to the support members. The outer support member 52 is connected with the ring 12 through vulcanizing. The elastic wall of the expansion chamber 17 together with the inner support member 51 is flanged into the outer support member 52 at location 57. Through suitably arranging of cuts 55 or holes 56 in the membrane 50 at an offset relative to the openings 20 in the support member, there are obtained partially hemispherical flow surfaces. In accordance therewith the function of the thusly equipped bearing generally corresponds to the function as described in connection with FIG. 1. However, the membrane 50 can be constructed comparatively soft, inasmuch as it is supported on both sides thereof. Hereby, there is rendered possible a still more specific correlation of the bearing with specialized purposes of application.

What is claimed is:

1. In an elastic rubber bearing with integrated hydraulic damping, including a bearing core, a ring-shaped spring element, and a base plate enclosing a work chamber filled with hydraulic liquid; a liquid-filled volumetrically-variable expansion chamber, a separating wall constituted of an elastic material having at least one opening therein, and a superimposed rigid separating support wall having cutouts extending intermediate said chambers; the improvement comprising: the separating wall constituted of elastic material forming an elastic membrane and said rigid separating support wall being generally hemispherical shaped, a flow throttling arrangement between the elastic membrane and the rigid separating support wall, said flow throttling arrangement including elongate passageways between said elastic membrane and said rigid separating wall communicating between said at least one opening in the elastic material and cutouts on the rigid separating wall to provide throttled flow opening means between said work chamber and expansion chamber, the elastic and the rigid separating support wall extending into the work chamber, and elastic ring means for elastically fastening said separating wall to a housing.

2. A rubber bearing as claimed in claim 1, wherein the membrane is elastically connected with the rigid separating support wall.

3. A rubber bearing as claimed in claim 1, wherein the membrane is arranged at an interspace between two screen-like spherical rigid support members.

4. A rubber bearing as claimed in claim 1, wherein the membrane is seated below the rigid separating support wall, and is elastically coupled to the rigid separating support wall to facilitate a restricted extent of movement thereof.

5. A rubber bearing as claimed in claim 1, wherein the membrane including a profiled surface of interconnected passageways between randomly distributed protruding wall segments; and said at least one opening comprising large through-openings being formed on the upper side of the membrane, said rigid separating wall having relatively large through-openings along its base region.

6. In an elastic rubber bearing, a bearing core, a ring-shaped spring element, and a bottom plate collectively enclosing a work chamber filled with a hydraulic liquid, said work chamber having at least one liquid-flow throttling opening means communicating with a liquid-filled volumetrically-variable expansion chamber; and a resiliently supported separating wall of elastic material having at least one opening and rigid separating wall structure with cutouts constituting support members for said elastic material separating wall extending between said chambers defining said throttling opening means; the improvement comprising: said support members including two superimposed spaced screen-like hemispherical support members, said elastic separating wall being an elastic membrane arranged at an interspace between said two screen-like hemispherical support members, said at least one opening in the elastic membrane comprising cutouts in the shape of a multiplicity of small apertures.

* * * * *